(12) United States Patent
Troudt

(10) Patent No.: US 8,595,902 B2
(45) Date of Patent: *Dec. 3, 2013

(54) EXTENSION POLE WITH DOCKING ASSEMBLY FOR A MATCHING TOOL

(75) Inventor: Kevin Troudt, Roswell, GA (US)

(73) Assignee: Stretta, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/272,151

(22) Filed: Oct. 12, 2011

(65) Prior Publication Data

US 2012/0118594 A1    May 17, 2012

Related U.S. Application Data

(63) Continuation of application No. 11/832,046, filed on Aug. 1, 2007, now Pat. No. 8,060,987.

(51) Int. Cl.
*B25G 1/04* (2006.01)

(52) U.S. Cl.
USPC .................................. 16/427; 30/135; 81/489

(58) Field of Classification Search
USPC ........... 16/110.1, 422, 426, 427, 429; 81/489, 81/177.2, DIG. 1; 15/145; 30/134, 135, 30/249–251
See application file for complete search history.

(56) References Cited

U.S. PATENT DOCUMENTS

| | | |
|---|---|---|
| 379,359 A | 3/1888 | Bosch |
| 1,511,361 A | 10/1924 | Paasche |
| 1,745,972 A | 2/1930 | Beck |
| 1,849,511 A | 3/1932 | Thompson |
| 2,541,063 A | 2/1951 | Hubbard ........................ 30/124 |
| 2,857,201 A | 10/1958 | Palmer |
| 3,017,056 A | 1/1962 | Bishop |
| 3,166,252 A | 1/1965 | Williams et al. |
| 3,317,997 A | 5/1967 | Hedstrom et al. |
| 3,856,209 A | 12/1974 | Hickson |
| 3,893,630 A | 7/1975 | Bochmann et al. |
| 3,915,382 A | 10/1975 | Davis |
| 3,940,072 A | 2/1976 | Ishikawa et al. |
| 3,977,570 A | 8/1976 | Smrt |
| 4,023,711 A | 5/1977 | Sena |
| 4,034,542 A | 7/1977 | Loehr |
| 4,323,196 A | 4/1982 | Logue et al. |
| 4,458,418 A | 7/1984 | McSmith et al. ............... 30/228 |
| 4,744,519 A | 5/1988 | Crowley |
| 4,886,191 A | 12/1989 | Yoshitomi |
| 4,944,093 A | 7/1990 | Falk ............................... 30/251 |
| 4,950,273 A * | 8/1990 | Briggs ......................... 606/113 |
| 5,084,975 A | 2/1992 | Melter ........................... 30/249 |
| 5,099,539 A | 3/1992 | Forester |
| 5,228,202 A | 7/1993 | Liao ............................... 30/249 |

(Continued)

FOREIGN PATENT DOCUMENTS

| | | |
|---|---|---|
| AU | 261350 | 1/1965 |
| CA | 873766 | 6/1971 |

*Primary Examiner* — William Miller
(74) *Attorney, Agent, or Firm* — Perkins Coie LLP

(57) ABSTRACT

An extension pole having a tool-actuating connection between a lever on the pole handle end and a tool on the pole distal end that remains operational by action of a lever on the pole proximal end through pole adjustment. A quick release mechanism on the pole distal end receives a tool matching that mechanism through which the movement of the lever is communicated to the tool causing the tool to operate in its normal function.

17 Claims, 6 Drawing Sheets

(56) References Cited

U.S. PATENT DOCUMENTS

| | | | |
|---|---|---|---|
| 5,261,163 A | 11/1993 | Shearhart | 30/242 |
| 5,304,190 A | 4/1994 | Reckelhoff et al. | 606/170 |
| 5,341,572 A | 8/1994 | Michelson | 30/228 |
| 5,372,389 A | 12/1994 | Tam et al. | |
| 5,894,625 A | 4/1999 | Vosbikian | |
| 5,947,388 A | 9/1999 | Woodruff | |
| 6,085,681 A | 7/2000 | Morton | |
| 6,311,397 B1 | 11/2001 | Hartzell et al. | 30/134 |
| 6,374,498 B1 * | 4/2002 | Liu | 30/211 |
| 6,619,569 B2 | 9/2003 | Jens | |
| 6,647,627 B2 | 11/2003 | Nickel | 30/135 |
| 6,685,115 B1 | 2/2004 | Hardin | |
| 6,901,665 B2 * | 6/2005 | Sun et al. | 30/249 |
| 7,540,093 B1 * | 6/2009 | Yeh | 30/244 |
| 7,574,805 B1 | 8/2009 | Lindroth | 30/250 |
| 7,861,414 B1 * | 1/2011 | Kern | 30/241 |
| 7,926,186 B2 * | 4/2011 | McLoughlin et al. | 30/244 |
| 2008/0168626 A1 | 7/2008 | Sewell | 16/427 |

\* cited by examiner

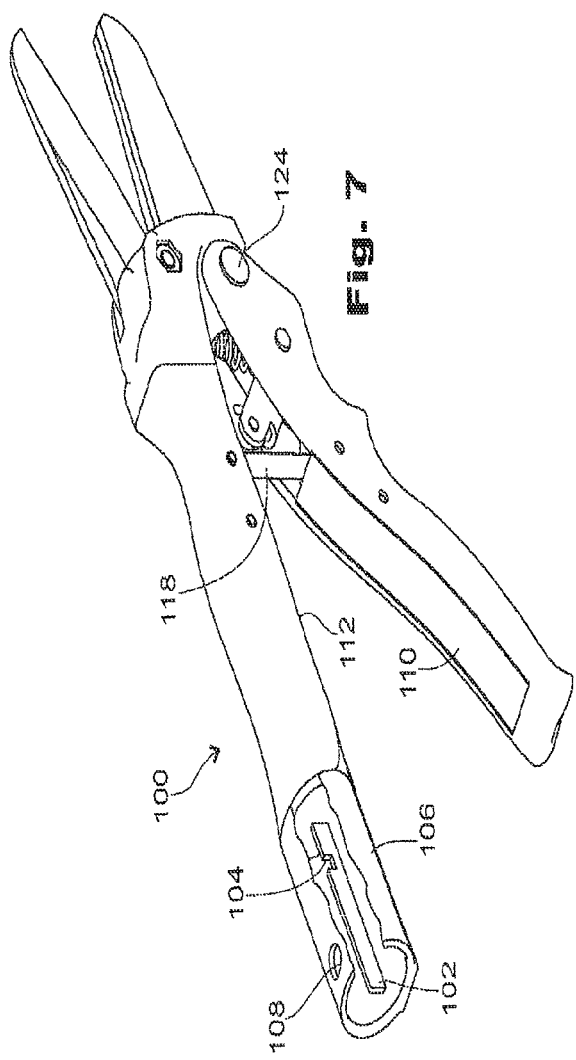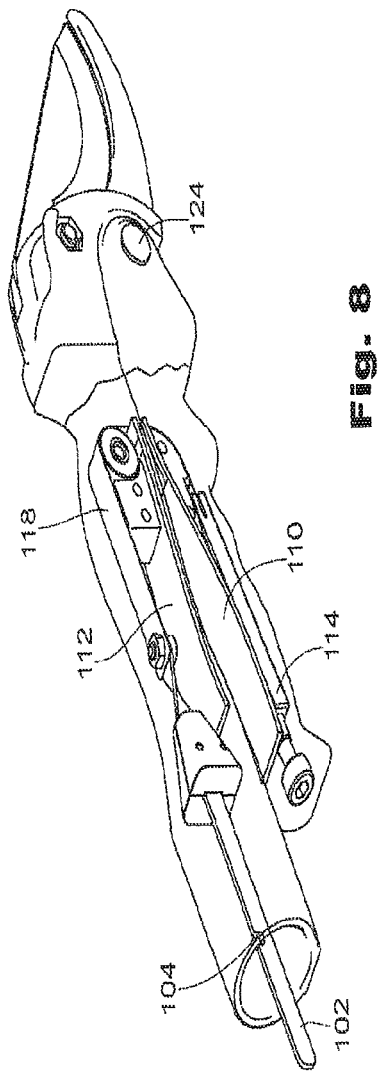

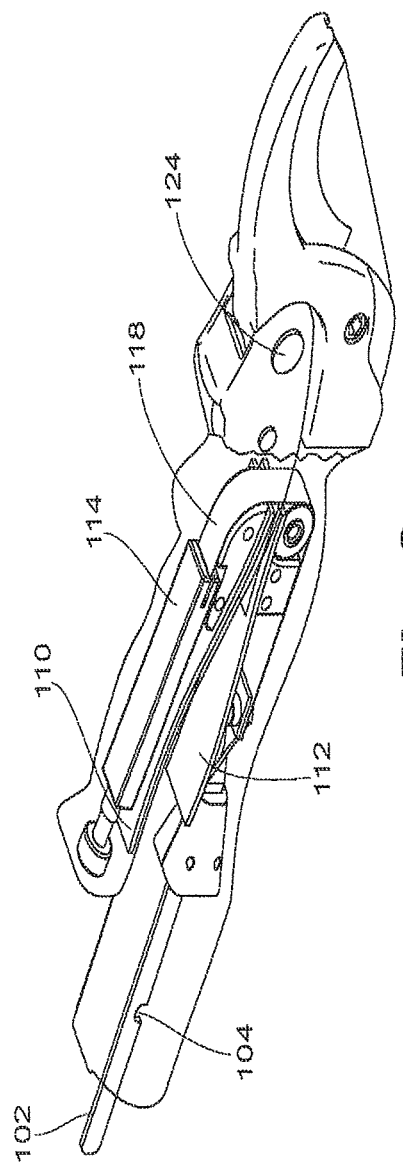
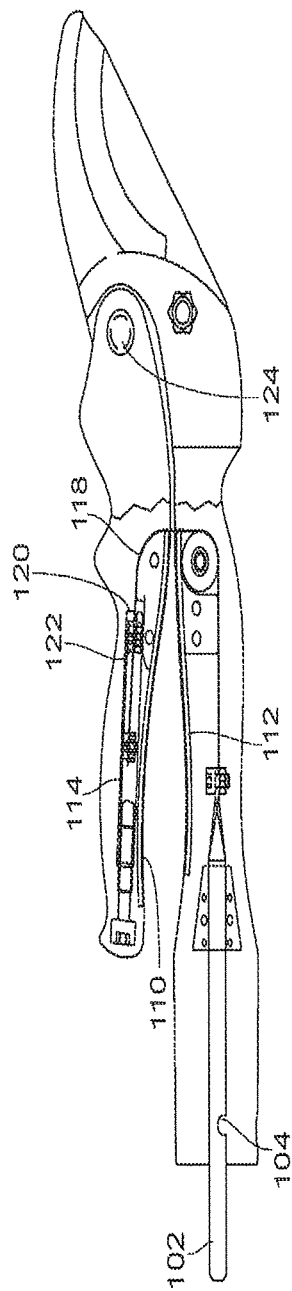

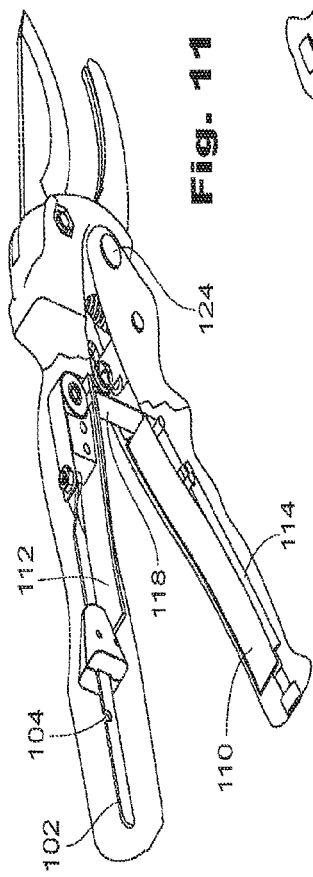
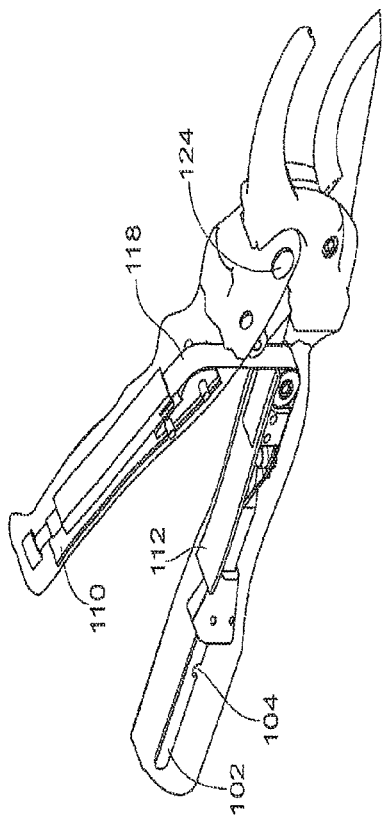
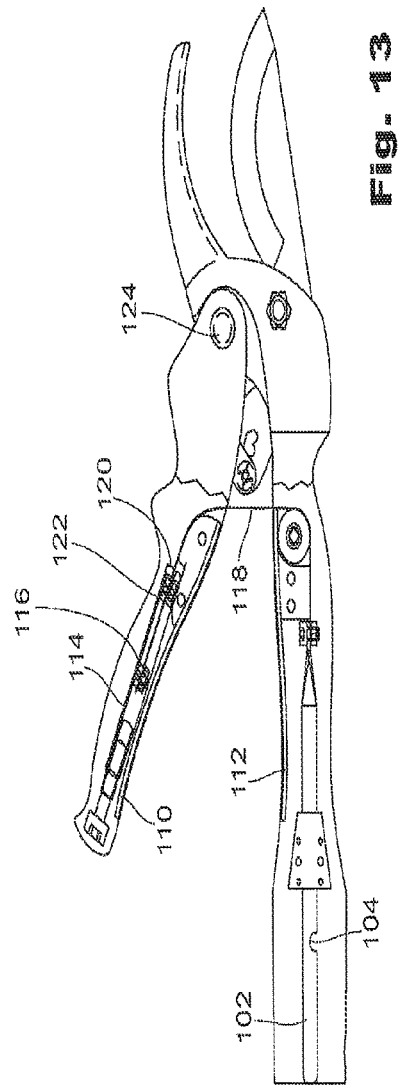

US 8,595,902 B2

EXTENSION POLE WITH DOCKING ASSEMBLY FOR A MATCHING TOOL

CROSS-REFERENCE TO RELATED APPLICATION

This application is a continuation of U.S. patent application Ser. No. 11/832,046, filed Aug. 1, 2007, now U.S. Pat. No. 8,060,987, which application is incorporated herein by reference in its entirety.

BACKGROUND

1. Field of the Invention

This invention relates generally to extension poles for tools with an adjustable connection between a pole handle end and an opposite pole accessory end to actuate a tool by action of a trigger pole actuator on the handle end and, more specifically, to an extension pole with a means to receive a selective tool on its distal end that cooperates with a lever on the pole proximal end to actuate the tool.

2. Prior Art

It has long been recognized that extending a user's reach through an extension pole is advantageous. A paint roller mounted on a pole allows one to work beyond one's natural reach. A tree branch cutter or saw on an extension pole allows one to access tree tops otherwise difficult to reach. For tools that require an actuating movement, for example, to squeeze a handle of a cutter to trim a branch, a connection between the pole tool end and the pole handle end is required to communicate movement of a pole actuator on the handle end to the tool on the pole tool end.

In extending one's reach with an extension pole the difficulty introduced is in maintaining the operation of the connection between the pole actuator on the pole handle end and the tool on the pole end to effect the desired function of the tool mounted to the tool end of the pole. Painting tools are fairly common, but the issue goes beyond painting. For example, if plant and shrub shears were mounted to the pole end, the grip of the shears would need to be squeezed together as in a normal operation of shears. In general, the extension pole requires a connection between a lever as a pole actuator on the pole handle end and the tool on the pole tool end to effect a normal operation of the tool, such as squeezing together handles of a pruner or shears.

Because there are a number of tools that could benefit from an extension pole, it would be advantageous to have a pole with a standard quick-release connection for receiving a tool. To be effective the tool would need to have a provision for exercising the tool in its normal manner of operation, such as squeezing together handles, by pulling a component in the tool. The connection then would need to communicate movement of the pole lever to that tool component to achieve remote functioning of the tool.

The primary object of the present invention then is to provide an extension pole having a tool-actuating connection between a lever on the pole handle end and a tool on the pole end. Another object is to provide a quick release mechanism on the pole end for receiving a tool matching that mechanism and through which the movement of the lever is communicated to the tool. It is another object that the mechanism be protected from damage by containing the mechanism internal to the pole.

SUMMARY

This object is achieved in an extension pole with a connection running between a pole accessory end where a selective tool such as shears or a pruner is releasably mounted and a pole handle end where a pole lever is located such that movement of the lever is communicated to the tool through the connection to effect a normal function of the tool. A pole attachment mechanism is provided internal to the pole for releasably receiving the selective tool while protecting the attachment from damage and the tool is provided with a tool attachment mechanism matching the pole attachment mechanism. The selective tool also is provided with internal mechanics such that exercise of the pole lever exercises the selective tool in its normal function. For all purposes herein, use of the term "lever" is deemed to include all movement of a pole actuator on the pole that effects movement to a tool attached to the pole.

BRIEF DESCRIPTION OF THE DRAWINGS

FIG. 7 is a perspective view of a typical tool attachable to the pole of the present invention, shown as a pruner with a cylindrical handle configured to mount to the pole tool and with a latch rod within configured to interface with the tool attachment member of the pole.

FIG. 8 is a perspective view of the selective tool, a pruner, viewed from a first side.

FIG. 9 is a perspective view pruner of FIG. 8, viewed from a second side.

FIG. 10 is a cut-away side view of the pruner of FIG. 8.

FIG. 11 is a perspective side view of the pruner of FIG. 8.

FIG. 12 is another perspective side view of the pruner of FIG. 8.

FIG. 13 is a side view of the pruner of FIG. 8.

DETAILED DESCRIPTION OF THE PREFERRED EMBODIMENT

Figure 1:
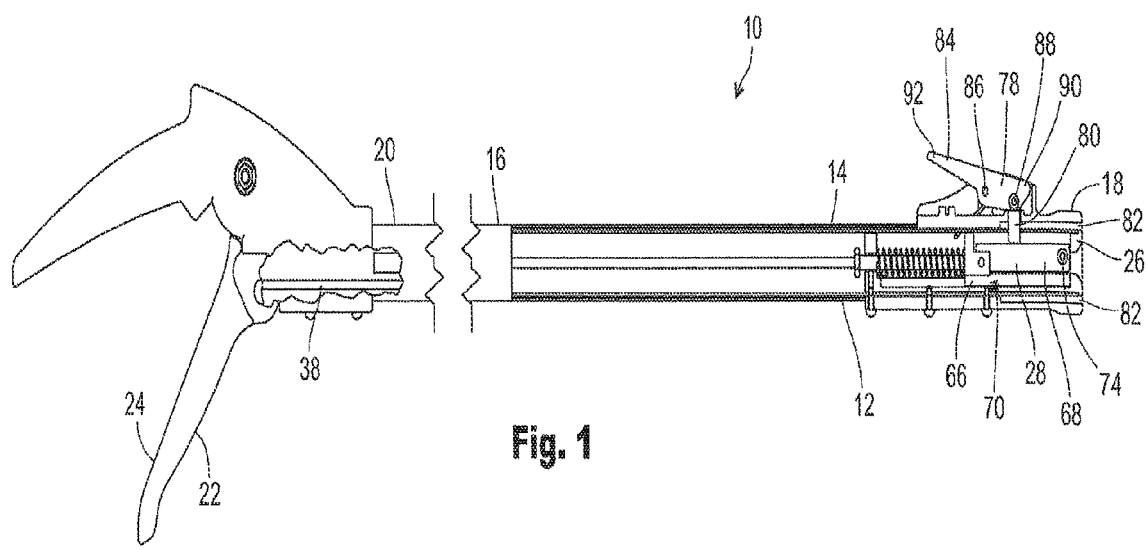
FIG. 1 is a side cut-away view of the tool extension pole showing a tool attachment member closed.
Figure 2:
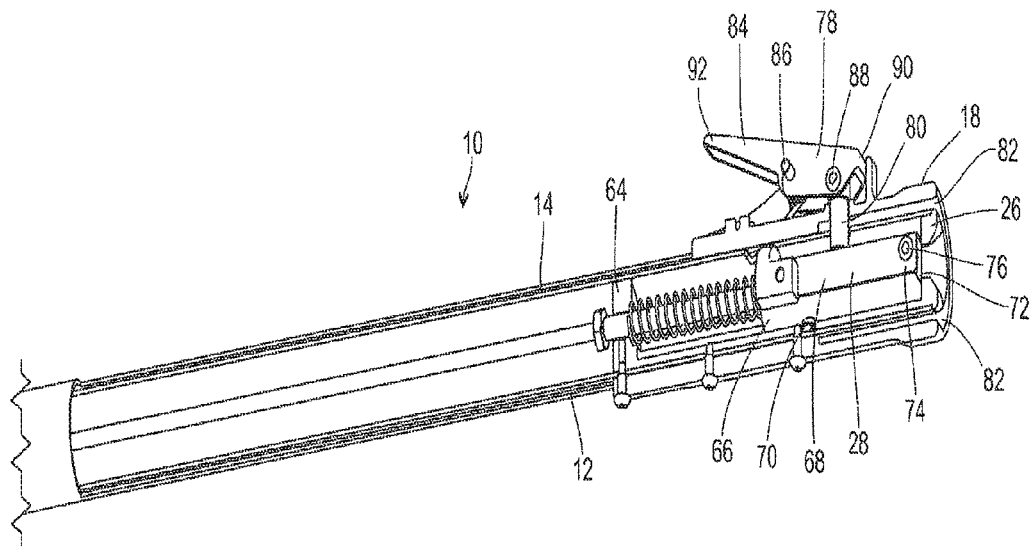
FIG. 2 is perspective view of the tool end of the pole of FIG. 1.
Figure 3:
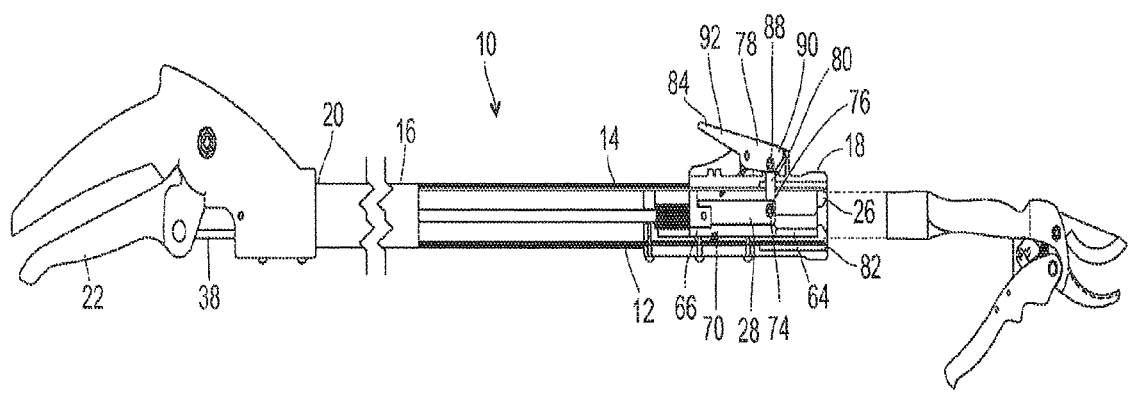
FIG. 3 is a side cut-away view of the pole of FIG. 1 showing a tool aligned for engagement with the extension pole.
Figure 4:
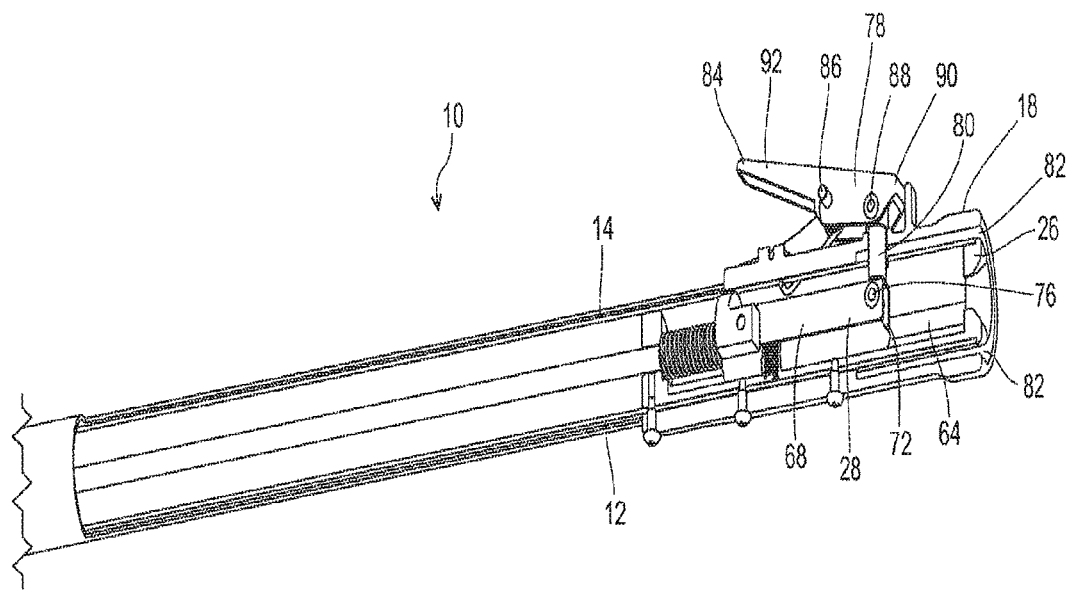
FIG. 4 is a perspective view of the tool end of the pole and tool of FIG. 3, shown with the tool engaged in the pole end.
Figure 5:
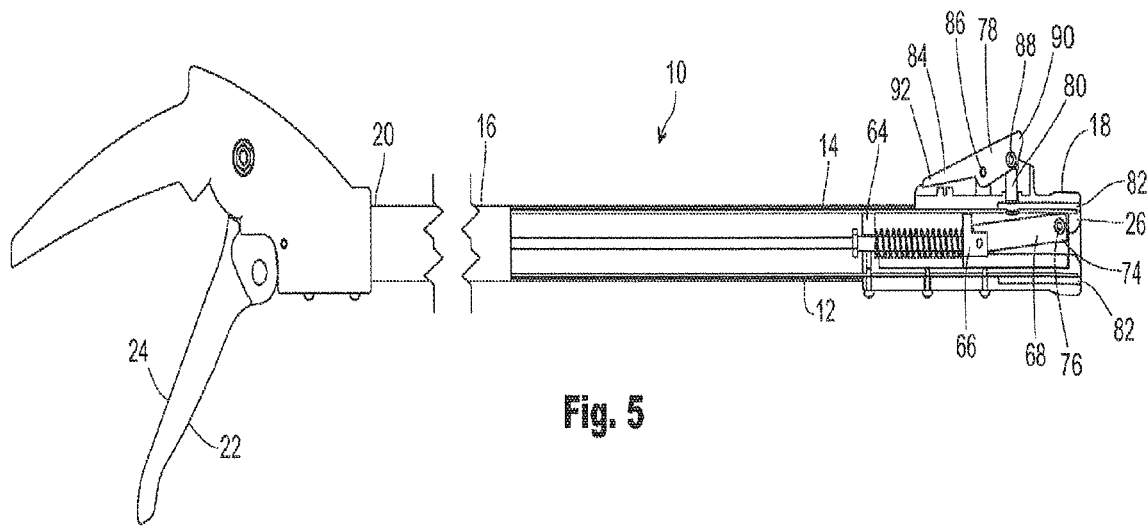
FIG. 5 is a side cut-away view of the tool extension pole of the present invention showing a tool attachment member open.
Figure 6:
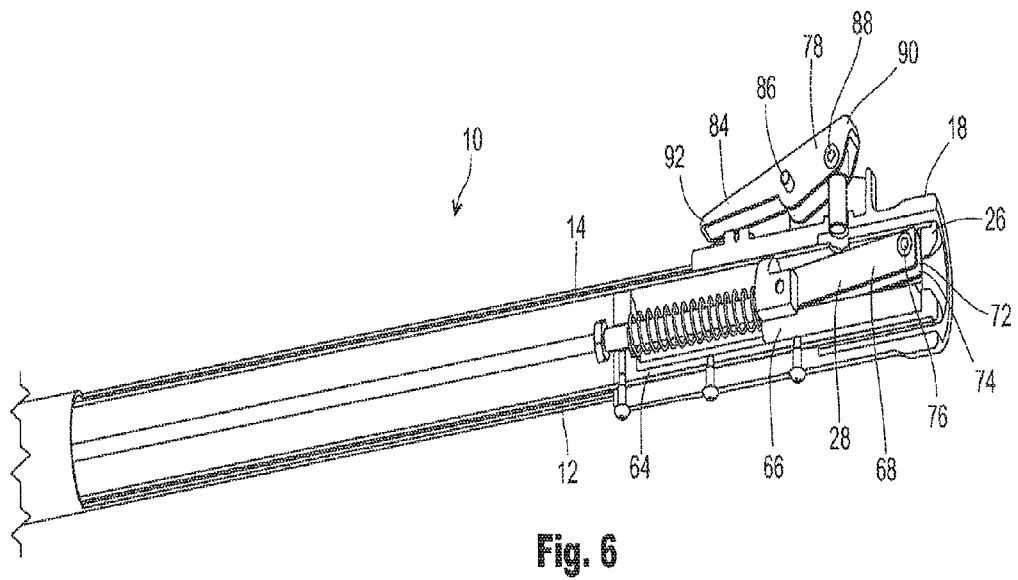
FIG. 6 is perspective view of the tool end of the pole as shown in FIG. 5.

The extension pole 10 of the present invention includes a tubular member 12 comprising a lower portion 14 and an upper portion 16 with a passageway longitudinal therethrough, with a distal, or tool end 18 and a proximal, or handle end 20. The pole 10 further comprises a lever as a pole actuator 22 pivotably mounted on the handle end 20 at the pole handle end 20, spring-biased to a rest position 24.

A tool attachment member 26 at and internal to the pole tool end 18 includes a quick release attachment apparatus 28 adapted to releasably secure a selective tool 100 to the pole tool end 18. The selective tool 100 for which the pole 10 and quick release attachment apparatus 28 is provided includes a latch rod 102 adapted to actuate the tool 100 in its normal operational function when pulled. Typically the selective tool 100 is selectable from a set of available tools, which gives versatility to the pole 10.

The selective tool 100 is mountable on the extension pole 10 and functions in one or both of two operating modes. In a first mode the tool 100 is made to move directly by a user independent of the pole 10, which movement implements a normal functional operation of the tool, such as a user squeezing a pruner lever as a first member to a pruner handle as a second member pivotably on a pivot pin on overlapping proximal ends to make pruner blades come together to cut something between the blades. In a second mode the tool 100 is made to function indirectly, that is, in the example of the pruner, the blades are made to come together, by a user operating the lever, or pole actuator 22 from the pole handle, or distal end. The tool 100 includes a latch rod 102 functionally connectible to the pole actuator 22, movement of which latch rod 102 implements the tool function, such as moving pruner blades together.

The latch rod 102 slidably extends axially within a tubular tool base that mounts approximately axially to the extension pole distal end. Upon connection of the tool base to the extension pole distal end, the tool base and the latch rod within extend into the extension pole distal end where they functionally connect to the pole actuator through the tool attachment member 26. The latch rod 102 is thus protected from access outside of the connected tool base and extension pole distal end which could otherwise damage the latch rod 102. When the tool is operated in its first mode the latch rod 102 within the tool base does not cause the latch rod to move external to the base, also protecting the latch rod 102 from damage. In fact, operation of the tool 100 in the first mode typically does not cause the latch rod 102 to move.

The tool attachment member 26 comprises a tool latch housing 64 secured to the pole tool end 18 and a carrier 66 slidable in the tool latch housing 64 and functionally connected to the pole actuator 22 such that the pole actuator 22 and the carrier 66 move in concert.

A tool latch 68 is pivotably mounted to the carrier 66, biased upward by a latch spring 70 to receive the tool latch rod 102. An opening 72 at a tool latch forward end 74 is adapted to receive a selective said tool 100 therein. A latch pin 76 is transverse across the opening 72 to secure the tool latch rod 102 in the tool attachment member 26. The tool latch rod 102 has a notch 104 that releasably receives the latch pin 76 to secure the tool latch rod 102 in the tool latch 68. Thus, the tool latch 68 pivots upward to receive the tool latch rod 102 into the tool latch 68 and downward to secure the tool latch rod 102 in the tool latch 68 with the latch pin 76 engaging the notch 104. The tool latch 68 similarly pivots upward to release the latch pin 76 from the notch 104 to disengage the tool 100 from the tool latch 68. A latch lock 78 includes a latch lock piston 80 that moves downward against the tool latch 68 urging the tool latch 68 downward against the bias of the latch lock spring 70 and upward in allowing the tool latch 68 to move upward under its spring bias.

The tool latch housing 64 is axially within but spaced apart from the lower portion 14 at the pole tool end 20 forming a cylindrical channel 82 between them for receiving a tubular tool handle end, or tubular base 106 as the tool latch rod 102 within the base 106 is received into the tool latch 68.

The latch lock piston 80 intersects the channel 82 as it moves downward. The latch lock piston 80 moves out of intersection with the channel 82 when it moves upward. Thus, as the latch lock piston 80 moves upward the tool tubular base, or handle end 106 is receivable in the channel 82 past the piston 80. With the tool handle end, or base 106 is in the channel 82 the piston 80 is movable downward through a tool handle hole 108 thus securing the tool 100 in the pole tool end 20 as the tool latch rod 102 connects to the tool latch 68 and thus to the pole actuator 22.

A latch lock handle 84 pivots on a latch lock pivot pin 86 that is secured to the lower portion 14. The latch lock piston 80 similarly pivots on the latch lock handle 84 on a piston pivot pin 88 in a latch lock handle first end 90. A latch lock handle second end 92 extends from the latch lock pivot pin 86 opposite the piston pivot pin 88 as a lever such that as the latch lock handle second end 92 is urged downward about the latch lock pivot pin 86, the latch lock handle first end 90 is lifted with the piston 80 connected thereto on the piston pivot pin 88, therein lifting the piston 80.

With the tool thus secured in the pole distal end and the tool latch rod 102 secured to the carrier 66, moving the pole actuator 22 moves the carrier in the pole attachment apparatus 28 which then moves the tool latch rod 102 in the tool 100.

In an alternative embodiment, instead of or in combination with the latch lock 78, a tool handle end, or base 106 is received in tool latch 68 against bias of a carrier spring 89 that urges the tool handle end, or base 106 out of the tool latch 68 until the tool handle end 106 is fully loaded in the tool latch 68, which is when a tool latch ball 91 is urged under ball spring bias into a recess 93 in the tool handle end 106 as a first securement of the tool in the tool latch 68. The latch lock may then more positively lock the tool into the latch lock. However, until the tool is secured by the tool latch ball 91, the tool 'pops' out, or at least forward out of the tool latch 68 so a user will recognize that the tool is not fully secured in the tool latch 68 prior to attempted use.

Illustrative of the set of selective tools that may be used with the pole having the tool attachment member 26, a pruner 100 and its functional operation is described. As illustrated in FIGS. 7-10, latch rod 102 is axially within tubular base 106 such that as the tubular base 106 inserts into cylindrical channel 82 in the pole end, the latch rod 102 also enters the tool latch housing 64 where it connects to the carrier 66.

The latch rod 102 and tubular base 106 are located in first tool member 112. In the first tool member 112, the latch rod 102 connects to cable 118, which wraps to second tool member 110 where the cable 118 connects to a slidable ball 116. The cable 118 extends from the latch rod 102 intermediate the first tool member 112 to connection with the ball 116 intermediate the second tool member 110. The ball 116 moves in channel 114 in second tool member 110 with the cable 118 passing through slot 120 in the channel 114. The tool 100 is exercised by bringing the first tool member 112 toward the second tool member 110. When the tool 100 is directly exercised by hand in its normal functional operation, that is a user directly squeezes the first and second tool members 106, 110 together in the user's hand, which might be the case when the tool is not attached to the extension pole, the ball 116 passes in the channel 114 from the slot 114 such that the direct operation does not move the latch rod 102. However, when the latch rod 102 is pulled, such as when it is connected to the carrier 66 of the attachment apparatus 28, the ball 116 against the channel top end 122 is pulled by the cable 118 connected to the latch rod 102, causing the second tool member 110 to move toward the first tool member 112. In the illustrative example of the pruner, the first and second tool members 106, 110 are handles of the pruner. Pulling the latch rod 102 thus exercises the tool 100 by pivoting the first tool member 112 toward the second tool member 110. When the handles move together the blades 124 of the pruner close together, cutting what might be between them.

The invention claimed is:

1. An extension pole apparatus, comprising;
an extension pole;
a tool attachment apparatus coupled to a distal portion of the extension pole;
a pole actuator coupled to a proximal portion of the extension pole opposite the distal portion;

a tool mountable on the tool attachment apparatus, the tool being configurable into one of at least two operating modes: (1) a first mode in which the tool is manipulable by a user independent of the pole, which movement implements a normal functional operation of the tool, and (2) a second mode in which the tool is made to function indirectly by a user from the pole distal portion by action of the pole actuator, configured such that the tool functionally operates through movement of the pole actuator;

the tool including a latch that is functionally coupleable to the pole actuator, movement of which latch implements the tool function;

the latch extending slidably within a tool base, which tool base mounts approximately axially to the extension pole distal portion as the latch functionally connects to the pole actuator internal to the connected tool base and extension pole distal portion such that the latch is protected from access outside of the connected tool base and extension pole distal portion; and wherein the latch is at least substantially within said tool base such that operation of the tool in the first mode does not cause the latch to move external to the base.

2. The extension pole apparatus of claim 1 wherein said latch is configured such that operation of the tool in the first mode does not cause the latch to move.

3. The extension pole apparatus of claim 1 wherein, upon connection of the tool base to the extension pole distal portion, the tool base and the latch within extend into the extension pole distal portion where they functionally connect to the pole actuator.

4. A tool attachment apparatus on an extension pole distal end in combination with a tool attachable to the distal end, the improvement comprising, a pole actuator on the extension pole toward a proximal end opposite the distal end;

a tool latch housing;

a carrier slidable in the tool latch housing with the pole actuator functionally secured to the carrier such that the pole actuator and the carrier move in concert; and a tool latch on the carrier with an opening at its forward end adapted to receive the tool, which tool includes a latch rod that functionally operates the tool when the latch rod is moved, and wherein the latch rod is functionally linked to the carrier such that when the carrier moves by action of the pole actuator, the latch rod linked thereto moves therein causing the tool to functionally operate when the pole actuator is moved.

5. The tool attachment apparatus of claim 4 wherein the tool latch is mounted pivotably to the carrier, the tool latch including a latch pin transverse across the opening adapted to receive the latch rod, which latch rod includes a tool latch rod having a notch configured to releasably receive the latch pin in securing the tool latch rod in the tool latch, wherein the tool latch pivots upward as the tool latch rod is received into the tool latch and downward with the latch pin engaging the notch and the tool latch pivots upward to release the latch pin from the notch to disengage said tool from the tool latch.

6. The tool attachment apparatus of claim 5 wherein the tool latch is spring biased upward to receive said tool latch rod and further comprising a latch lock with a latch lock piston moving downward against the tool latch urging the tool latch downward against the spring bias and upward allowing the tool latch to move upward under its spring bias, the tool latch and latch lock thus cooperating to engage and disengage said tool latch rod from the extension pole.

7. The tool attachment apparatus of claim 6 wherein the tool latch housing forms a cylindrical channel between the tool latch housing and a pole tubular distal end for receiving a tubular tool base, the tubular base including said tool latch rod therein, the tool latch rod being received into the tool latch.

8. The tool attachment apparatus of claim 7 wherein the piston intersects the channel as it moves downward and wherein the piston moves out of intersection with the channel as it moves upward such that the latch lock piston is moved upward as said tool handle end is received in the channel past the piston and when said tool handle in the channel the piston moves downward through a tool latch hole thus securing the tool in the extension pole end with the tool latch rod connected to the second rod.

9. The tool attachment apparatus of claim 7 wherein the latch lock further comprises a latch lock handle mounted pivotably on a latch lock pivot pin secured to the tubular member with the latch lock piston secured pivotably to the latch lock handle on a piston pivot pin in a latch lock handle first end with a latch lock handle second end extending from the latch lock pivot pin opposite the piston pivot pin as a pole actuator such that as the latch lock handle second end is urged downward about the latch lock pivot pin, the latch lock first end, with the piston connected thereto on the piston pivot pin, is lifted therein lifting the piston, the latch lock further comprising a latch lock spring biasing the latch lock second end upward and thus the piston downward.

10. The tool attachment apparatus of claim 7 wherein said latch rod is axially within said tubular base such that as the tubular base inserts into said cylindrical channel in the pole end, the latch rod also enters the tool latch housing where it connects to the carrier.

11. The tool attachment apparatus of claim 10 wherein the tool comprises first and second members mutually pivoting from a pivot pin at overlapping proximal ends, the latch rod and the tubular base being located in the first tool member with the base at a first member distal end and further comprising in the first tool member a cable to which the latch rod connects, which cable extends from the latch rod intermediate the first member to connection intermediate the tool second member, wherein the tool is exercised by pivoting the first tool member toward the second tool member by pulling the latch rod.

12. The tool attachment apparatus of claim 11 further comprising a ball in the second tool member movable in a channel in the second tool member with the cable passing to the ball through a slot at a channel first end such that when the tool is directly exercised in its normal functional operation in by manually directly squeezing the first and second tool members together in a user's hand, the ball passes in the channel from the slot such that the direct operation does not move the latch rod.

13. An extension pole in combination with a tool removably coupleable to a tool attachment apparatus on a distal end of the extension pole, comprising:

a pole actuator on the extension pole toward a proximal end of the extension pole opposite the distal end;

a tool mountable on the extension pole and configurable in one of at least two operating modes: (1) a first mode in which the tool can be moved directly by a user, independent of the pole, which movement implements a normal functional operation of the tool, and (2) a second mode in which the tool can function indirectly by a user from the distal end by action of the pole actuator, configured such that the tool functionally operates through movement of the pole actuator; and the tool including a latch rod accessible by the extension pole, movement of the latch rod implementing the tool movement, the latch rod extending axially and slidably within a hollow tool base, the tool base being mounted approximately axially within the extension pole distal end as the latch rod functionally connects to the pole actuator internal to the connected tool base and extension pole distal end such that the latch rod is protected from access outside of the connected tool base and extension pole distal end;

a tool latch housing;

a carrier slidable in the tool latch housing with the pole actuator functionally secured to the carrier such that the pole actuator and the carrier move in concert; and a tool latch on the carrier with an opening at its forward end adapted to receive said tool, wherein the latch rod is functionally linked to the carrier such that, when the carrier moves by action of the pole actuator, the latch rod linked thereto moves therein causing the tool to functionally operate when the pole actuator is moved; and wherein the tool latch housing forms a channel between the tool latch housing and a pole tubular distal end for receiving a tubular tool base, the tubular base including said tool latch rod therein, the tool latch rod being received into the tool latch.

14. The tool attachment apparatus of claim 13 wherein the tool latch is mounted pivotably to the carrier, the tool latch including a latch pin transverse across the opening adapted to receive the latch rod, which latch rod includes a tool latch rod having a notch configured to releasably receive the latch pin in securing the tool latch rod in the tool latch, wherein the tool latch pivots upward as the tool latch rod is received into the tool latch and downward with the latch pin engaging the notch and the tool latch pivots upward to release the latch pin from the notch to disengage said tool from the tool latch.

15. The tool attachment apparatus of claim 14 wherein the tool comprises first and second members mutually pivoting from a pivot pin at overlapping proximal ends, the latch rod and the tubular base being located in the first tool member with the base at a first member distal end and further comprising in the first tool member a cable to which the latch rod connects, which cable extends intermediate the tool members between them and from the latch rod in the first tool member to connection intermediate the tool second member, wherein the tool is exercised by pivoting the first tool member toward the second tool member by pulling the latch rod.

16. The tool attachment apparatus of claim 15 further comprising a ball in the second tool member movable in a channel in the second tool member with the cable passing to the ball through a slot at a channel first end such that when the tool is directly exercised in its normal functional operation in by manually directly squeezing the first and second tool members together in a user's hand, the ball passes in the channel from the slot such that the direct operation does not move the latch rod.

17. The tool attachment apparatus of claim 15 further comprising a tool handle end, or base receivable into the tool latch against bias of a carrier spring that urges the tool handle end, or base out of the tool latch until the tool handle end is fully loaded in the tool latch as an indication that the tool is not yet fully loaded in the tool latch and further comprising a tool latch ball urged under ball spring bias into a recess in the tool handle end as a first securement of the tool in the tool latch against the carrier spring tool is secured by the tool latch ball, the tool urged out, or at least forward out of the tool latch until the tool is secured in the tool latch by the first securement.

* * * * *